United States Patent
Howard et al.

(10) Patent No.: US 10,233,997 B2
(45) Date of Patent: Mar. 19, 2019

(54) PLANETARY GEAR SETS FOR POWER TRANSMISSIONS

(71) Applicant: Sikorsky Aircraft Corporation, Stratford, CT (US)

(72) Inventors: Bertrand J. Howard, Shelton, CT (US); David A. Binney, Milford, CT (US); Vinicius Silva, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 201 days.

(21) Appl. No.: 15/221,179

(22) Filed: Jul. 27, 2016

(65) Prior Publication Data

US 2017/0030432 A1   Feb. 2, 2017

Related U.S. Application Data

(60) Provisional application No. 62/198,465, filed on Jul. 29, 2015.

(51) Int. Cl.
    *F16H 1/28*    (2006.01)
    *F16H 57/08*    (2006.01)

(52) U.S. Cl.
CPC ......... *F16H 1/2836* (2013.01); *F16H 1/2863* (2013.01); *F16H 57/082* (2013.01); *F16H 2057/085* (2013.01)

(58) Field of Classification Search
None
See application file for complete search history.

(56) References Cited

U.S. PATENT DOCUMENTS

| | | | | |
|---|---|---|---|---|
| 2,144,937 A | * | 1/1939 | Ryder | F16H 1/48 475/346 |
| 2,444,734 A | * | 7/1948 | Gillett | F16H 1/2863 33/199 R |
| 3,292,460 A | * | 12/1966 | Fritsch | F16H 1/2836 475/347 |
| 3,315,547 A | * | 4/1967 | Fritsch | F16H 1/2836 475/346 |

(Continued)

FOREIGN PATENT DOCUMENTS

| | | | | |
|---|---|---|---|---|
| DE | 10314069 A1 | * | 10/2004 | F16H 35/02 |
| JP | 2008038944 A | * | 2/2008 | F16H 57/082 |

OTHER PUBLICATIONS

"Dynamic Load Sharing Behavior of Planetary Gear Train with Backlashes", Chen, et al, IEEConnputing Society, 2009 International Conference on Engineering Computation, (Year: 2009).*

(Continued)

*Primary Examiner* — Dirk Wright
(74) *Attorney, Agent, or Firm* — Cantor Colburn LLP

(57) ABSTRACT

A planetary gear arrangement includes a planet carrier assembly defining a sun gear rotation axis for rotatably supporting a plurality of planetary gears about the sun gear rotation axis and a positioning element coupling a first of the planetary gears to the planet carrier. The planetary gear is movable between first and second positions for displacing a rotation axis of the first of the planetary gears relative to the sun gear rotation axis to change load share among the plurality of planetary gears.

15 Claims, 7 Drawing Sheets

(56) References Cited

U.S. PATENT DOCUMENTS

| | | | | |
|---|---|---|---|---|
| 3,635,103 | A * | 1/1972 | Monti | F16C 23/10 |
| | | | | 384/255 |
| 4,759,229 | A * | 7/1988 | Takahashi | F16H 1/2863 |
| | | | | 475/331 |
| 5,472,386 | A | 12/1995 | Kish | |
| 6,344,009 | B1 * | 2/2002 | Wirz | F16H 13/06 |
| | | | | 475/185 |
| 6,719,658 | B2 * | 4/2004 | Haga | F16H 1/2836 |
| | | | | 475/163 |
| 6,893,375 | B2 * | 5/2005 | Butsch | F16H 1/2836 |
| | | | | 475/347 |
| 2003/0073537 | A1 * | 4/2003 | Lloyd | F16H 1/2863 |
| | | | | 475/331 |
| 2004/0247437 | A1 * | 12/2004 | Otaki | H02K 7/183 |
| | | | | 416/132 B |
| 2008/0032850 | A1 * | 2/2008 | Ishizuka | F16H 57/082 |
| | | | | 475/331 |
| 2011/0021309 | A1 * | 1/2011 | Loeshner | F16C 19/38 |
| | | | | 475/348 |

OTHER PUBLICATIONS

Determination of Load Sharing Factor for Planetary Gearing With Small Tooth Number Difference , Xiao-Long , Mech. Mach. Theory vol. 30, No. 2, pp. 313-321, 1995 (Year: 1995).*

* cited by examiner

PLANETARY GEAR SETS FOR POWER TRANSMISSIONS

CROSS-REFERENCE TO RELATED APPLICATIONS

This application claims the benefit of priority under 35 U.S.C. § 119(e) to U.S. Provisional Application No. 62/198,465, filed Jul. 29, 2015, which is incorporated herein by reference in its entirety.

BACKGROUND OF THE INVENTION

1. Field of the Invention

The present disclosure relates to transmissions, and more particularly to planetary gear sets for mechanical power transmissions such as in helicopters.

2. Description of Related Art

Aircraft like helicopters commonly include transmissions that transfer rotational energy from the one or more engines mounted on the aircraft airframe to rotor systems supported by the airframe. Since the one or more engines generally rotate with shaft speeds that are different from the shaft speed of the aircraft rotor system, the aircraft transmission commonly include gear arrangements that convert an input torque to output torques suitable for the aircraft rotor systems. For example, some transmission systems include planetary gear arrangements with a ring gear, a sun gear, and planetary gears intermeshed between the ring gear and the sun gear for transferring torque between input and output shafts coupled to the gear arrangement. The planetary gears communicate torque between the ring gear and the sun gear while the planetary gear set transmits rotational energy. In this respect, for a planetary gear arrangement having transferring a given load and having a certain number of planetary gears, the share of total torque carried by each planetary gear is ideally the total load divided by the number of planetary gears in the planetary gear arrangement.

Such conventional methods and systems for power transmission have generally been considered satisfactory for their intended purpose. However, there is still a need in the art for improved planetary gear sets for power transmission systems. The present disclosure provides a solution for this need.

SUMMARY OF THE INVENTION

A planetary gear arrangement includes a planet carrier, first and second planetary gears, and a positioning element. The planet carrier defines a sun gear rotation axis and rotatably supports the first and second planetary gears. The positioning element couples the first planetary gear to the planet carrier to displace the first planetary gear between first and second positions relative to the sun gear rotation axis to balance load share between the first planetary gear and the second planetary gear.

In certain embodiments the first position can be circumferentially offset from the second position relative to the sun gear rotation axis. The first position can be radially offset from the second position relative to the sun gear rotation axis. The first position can be circumferentially and radially offset relative to the sun gear rotation axis. The positioning element can be fixed to the planet carrier by a bearing retainer.

In accordance with certain embodiments, the positioning element can include an eccentric coupling defining a planetary gear rotation axis. The eccentric coupling can be a first eccentric component, and the positioning element can include a second eccentric coupling. The first eccentric coupling can be seated in the second eccentric coupling, and the second eccentric coupling can be seated in the planet carrier. Each of the first and second eccentric couplings can be rotatable relative to each other and the planet carrier. It is contemplated that the eccentric coupling can include an offset bearing race, an offset liner, and/or an active element such as a linear actuator.

In another aspect, a planetary gear system includes a planetary gear arrangement as described above with an actuated positioning element and a control module. The actuated positioning element couples the first planetary gear to the planet carrier and is configured to displace the first planetary gear between first and second positions relative to the sun gear rotation axis. The control module is operably associated with the actuated positioning element for moving the first planetary gear using the actuated positioning element between the first and second positions based on load share balance between the first and second planetary gears.

In embodiments, the planetary gear system includes a sensor coupled to the planetary gear arrangement and communicative with the control module. The sensor can measure force, acceleration, backlash, noise, temperature, or any other suitable parameter within the planetary gear arrangement to balance load share between the planetary gears. It is contemplated that the measurements can be acquired real-time, while rotational energy is being transferred through the planetary gear arrangement, for balancing load share between the planetary gears. A processor and a memory can be included in the control module for displacing the first planetary gear between the first and second positions.

In a further aspect, a method of adjusting a planetary gear arrangement includes determining load share among first and second planetary gears, calculating a displacement of the first planetary gear relative to the second planetary gear to reduce load share imbalance between the first and the second planetary gears and displacing the first planetary gear relative to the second planetary gear using the calculated displacement.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
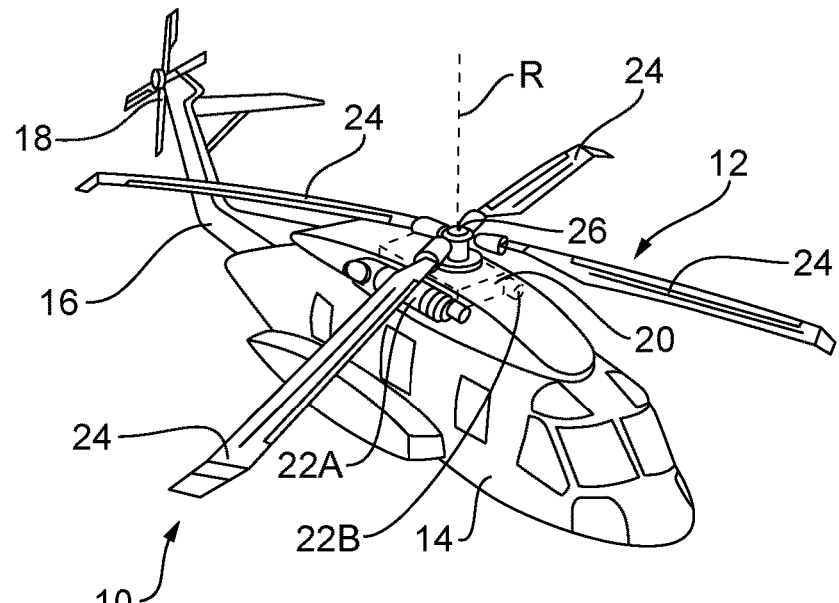
FIG. 1 is a perspective view of an exemplary embodiment of a rotorcraft constructed in accordance with the present disclosure, showing a rotorcraft with a having a transmission connecting an engine to a rotor system.

Reference will now be made to the drawings wherein like reference numerals identify similar structural features or aspects of the subject disclosure. For purposes of explanation and illustration, and not limitation, a partial view of an exemplary embodiment of an aircraft with planetary gear set in accordance with the disclosure is shown in FIG. 1 and is designated generally by reference character 10. Other embodiments of aircraft, transmissions, and planetary gear sets in accordance with the disclosure, or aspects thereof, are provided in FIGS. 2-6, as will be described. The systems and methods described herein can be used for transmitting rotational power between engines and rotor systems in aircraft, such as helicopters, however the invention is not limited to a particular type of aircraft or to aircraft in general.

With reference to FIG. 1, rotary wing aircraft 10 is shown. Rotary wing aircraft 10 includes a main rotor system 12 and an airframe 14 having an extending tail 16, which mounts a tail rotor system 18, such as an anti-torque system. One or more engines, e.g. a first main engine 22A and a second main engine 22B, drive main rotor assembly 12 about an axis of rotation R through a gearbox 20 (shown in dashed outline). Main rotor system 12 includes a plurality of rotor blades 24 (four illustrated) mounted for rotation with a main rotor shaft 26. Although a particular helicopter configuration is illustrated and described in the disclosed example, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit.

Figure 2:
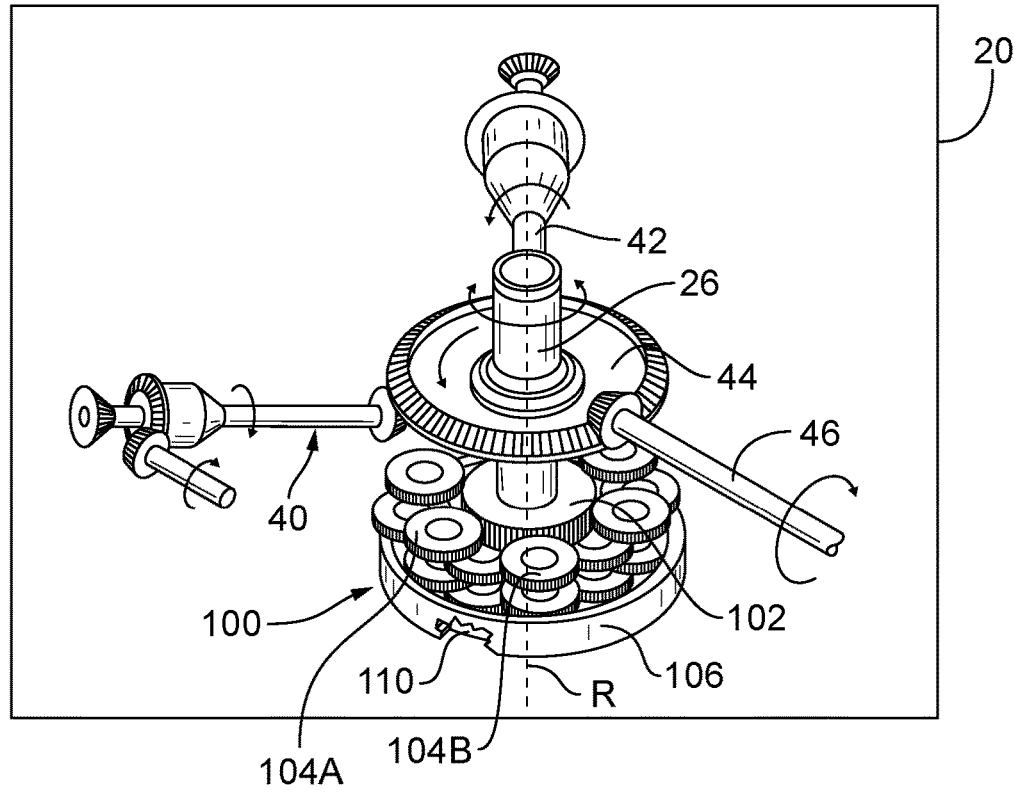
FIG. 2 is a schematic perspective view of the transmission FIG. 1, showing a planetary gear set connecting input shafts to a main rotor shaft and takeoff shaft.

With reference to FIG. 2, gearbox 20 is shown. Gearbox 20 includes a first input pinion shaft 40, a second input pinion shaft 42, a bull gear 44, and main rotor shaft 26. Gearbox 20 also includes a planetary gear set 100 including a sun gear 102, a plurality of planetary gears 104 including a first planetary gear 104A and a second planetary gear 104B, and a ring gear 106. Second planetary gear 104B is disposed between adjacent pairs of first planetary gears 104A. As illustrated, gearbox 20 includes twelve (12) planetary gears in an axially stacked arrangement. In embodiments, gearboxes described herein may have fewer or more planetary gears than in the illustrated exemplary embodiment, as suitable for an intended application. In certain embodiments, gearbox 20 may have five (5) planetary gears in a planar or axially stacked arrangement.

First input pinion shaft 40 is connected to first engine 22A (shown in FIG. 1) and has a pinion gear that intermeshes with bull gear 44. This transfers rotational energy at a first shaft rotational speed from first engine 22A to bull gear 44, which in turn applies torque to main rotor shaft 26. Second input pinion shaft 42 is similarly arranged with the difference that second input pinion haft 42 is connected to second engine 22B and transfers rotational energy at a second shaft rotational speed from second engine 22B to bull gear 44, thereby applying additional torque to main rotor shaft 26. Bull gear 44 is connected to main rotor shaft 26 for common rotation with main rotor shaft 26 about rotation axis R to provide output rotational energy to main rotor system 12 (shown in FIG. 1). Takeoff pinion shaft 46 includes a pinion gear that intermeshes with bull gear 44 for receiving rotational energy therefrom, and transmits the rotational energy to tail rotor system 18 (shown in FIG. 1).

Main rotor shaft 26 extends below (relative to the drawing figure) bull gear 44 along rotation axis R and is connected to sun gear 102. Planetary gears 104 are rotatably disposed in a circumferential arrangement about sun gear 102, and have teeth that intermesh with teeth of sun gear 102 such that load is communicated through the intermeshed teeth. Ring gear 106 extends circumferentially about rotation axis R, sun gear 102, and planetary gears 104 in a radially outward arrangement such that teeth of ring gear 106 facing radially inward intermesh with teeth of the plurality of planetary gears. Ring gear 106 is rotationally fixed relative to aircraft 14 (shown in FIG. 2), and torque from sun gear 102 is distributed into each of the plurality of planetary gears 104.

Each of the plurality of planetary gears 104 are supported for rotation by a planet carrier 110. Planet carrier 110 is fixed relative to aircraft 14 (shown in FIG. 1) and includes a plurality of apertures within shafts mounting the respective planetary gears 104 seat. The apertures are arranged circumferentially about rotation axis R on a fixed pitch, that is with a common circumferential offset between respective pairs of circumferentially adjacent apertures, and with a common radial offset relative to rotation axis R. One or more positioning elements 120 are operable connected to the plurality of planetary gears 104 for changing either or both of the radial spacing and pitch of the coupled pinion gear relative to rotation axis R and/or rendering the pitch between the circumferentially adjacent planetary gears asymmetrical. Changing the position of one or more of the planetary gears can change the distribution of backlash throughout the planetary gears, changing the load share distribution across the planetary gear set. Consequently, by driving one or more of the planetary gears radially and/or circumferentially, backlash can be driven to below a level below that achievable for the machining and assembly tolerances of the components of the planetary gear set. Although a single positioning element is shown in FIG. 2, it is to be understood and appreciated that two or more positioning elements can be employed in embodiments of planetary gear sets described herein, as suitable for a given application.

Figure 3A:
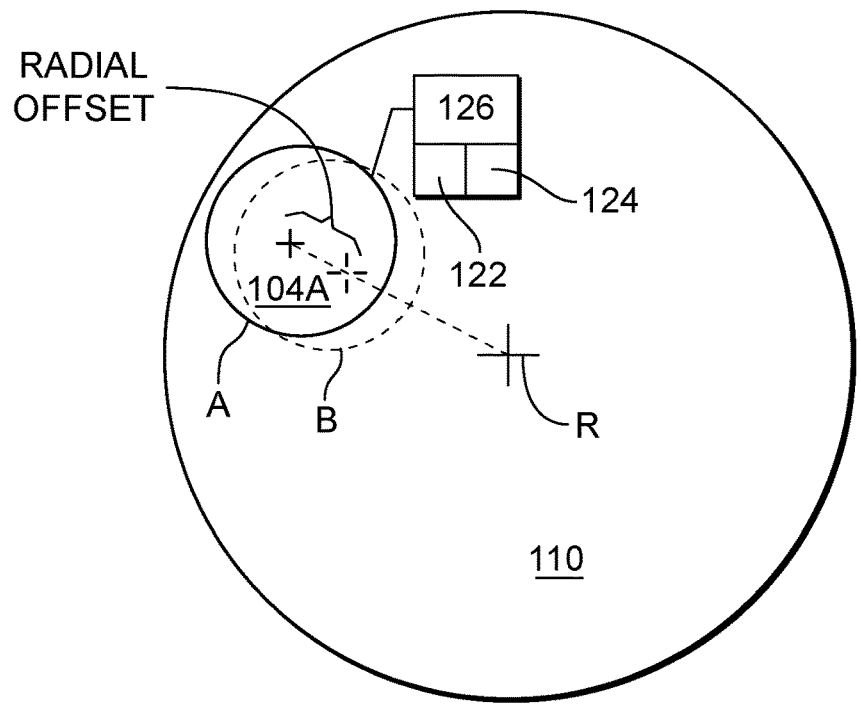
FIGS. 3A-3C are schematic top plan view of planetary gears and planetary gear carriers, showing positioning elements displacing the planetary gears between first and second positions relative to the planetary gear carriers.
Figure 3B:
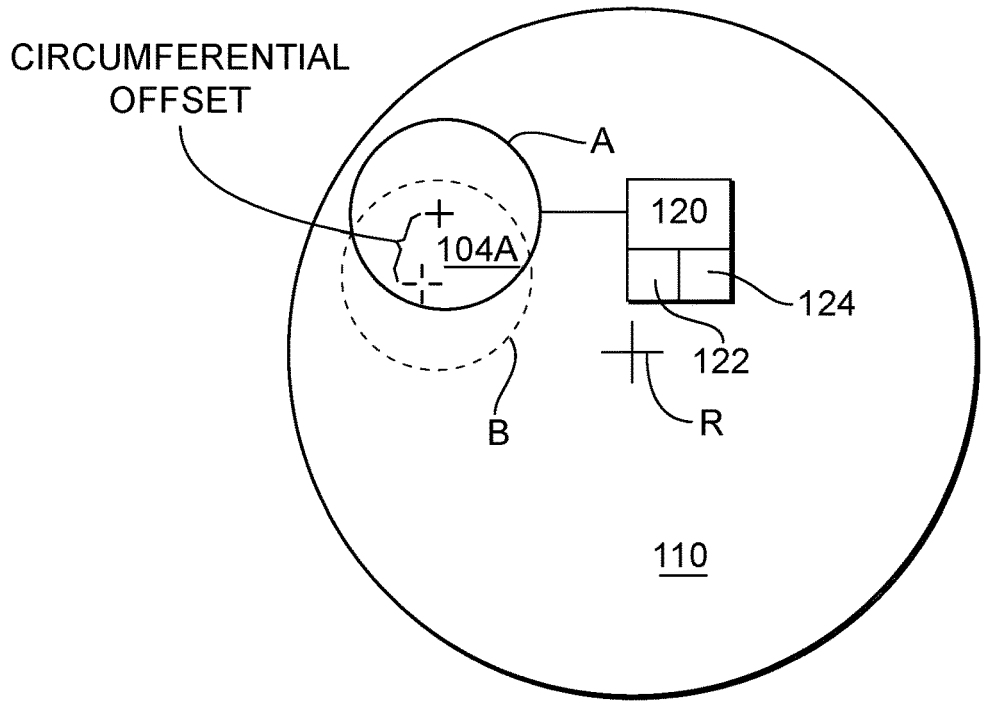
Figure 3C:
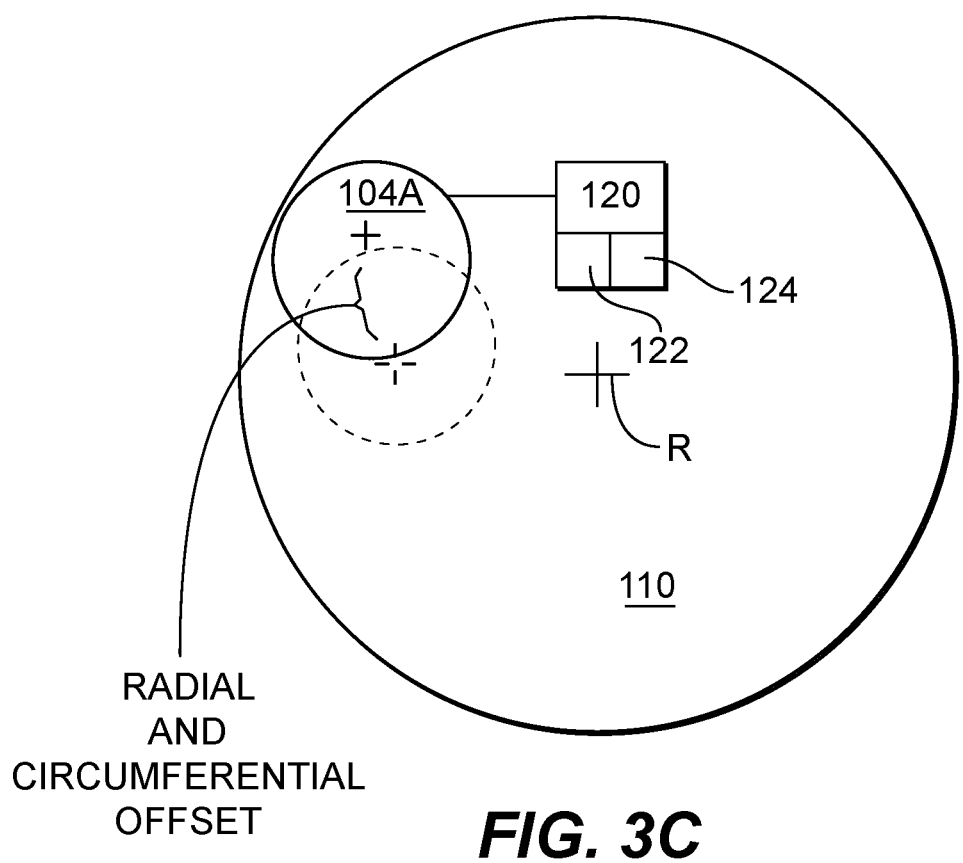

With reference to FIGS. 3A-3C, a portion of planetary gear set 100 including planetary gears 104, planet carrier 110, and positioning element 120 are shown. First planetary gear 104A has a first position A and a second position B. As indicated at FIG. 3A, second position B may be radially offset only from first position A relative to rotation axis R. As indicated at FIG. 3B, second position B may circumferentially offset only from first position A about rotation axis A. As indicated at FIG. 3C, second position B may be offset both radially and circumferentially relative to first position A. Positioning element 120 is connected to first planetary gear 104A for moving first planetary gear 104A between first position A and second position B for changing load on first planetary gear 104A. As will appreciated, displacing first planetary gear 104A by the exemplary displacements shown in FIGS. 3A-3C changes the backlash among the teeth of the plurality of planetary gears 104 (shown in FIG. 2). This changes the load share distribution among the planetary gears, and allows for distributing load share such that each of the plurality of gears shares load more equally than were load share determined by manufacturing and/or assembly variation of a selected set of gears.

Figure 4A:
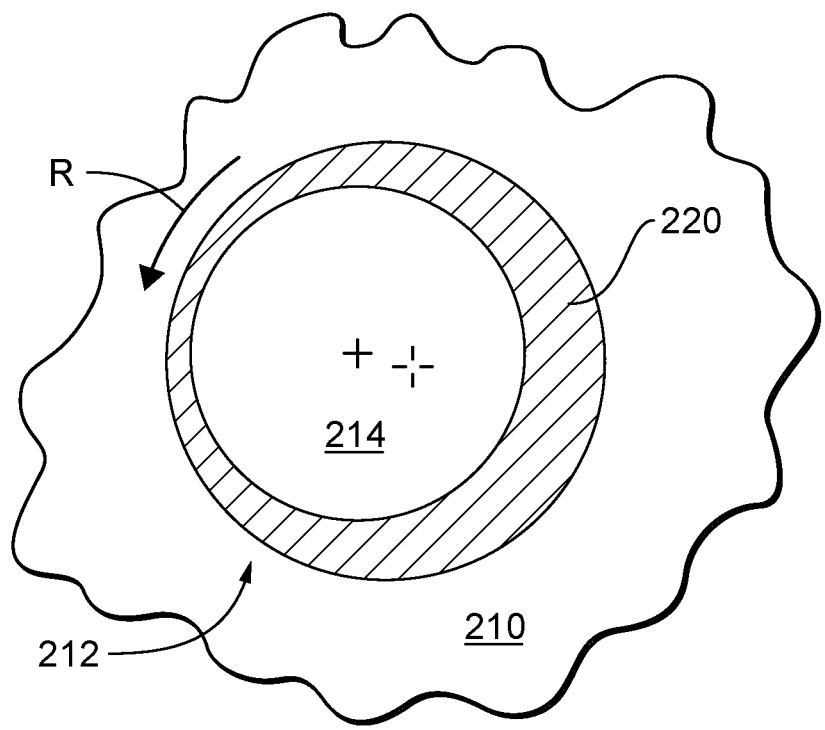
FIGS. 4A-4D are schematic views of positioning elements operably connected to planetary gears for displacing the planetary gears relative to the planetary gear carriers, according to embodiments.

Referring to FIGS. 4A-4D, embodiments of positioning element 120 are shown. With reference to FIG. 4A, a positioning element 220 is shown according to a first embodiment. Positioning element 220 is similar to positioning element 120 (shown in FIG. 4A) and includes an offset liner 222. Offset liner 222 is seated within an aperture 212 of planet carrier 210 and has offset aperture 214 for rotatably supporting a planetary gear. Respective centers of aperture 212 apertures 214 are offset relative to one another both circumferentially and radially according to rotation R of positioning element 220, which can, for example, be a liner.

Figure 4B:
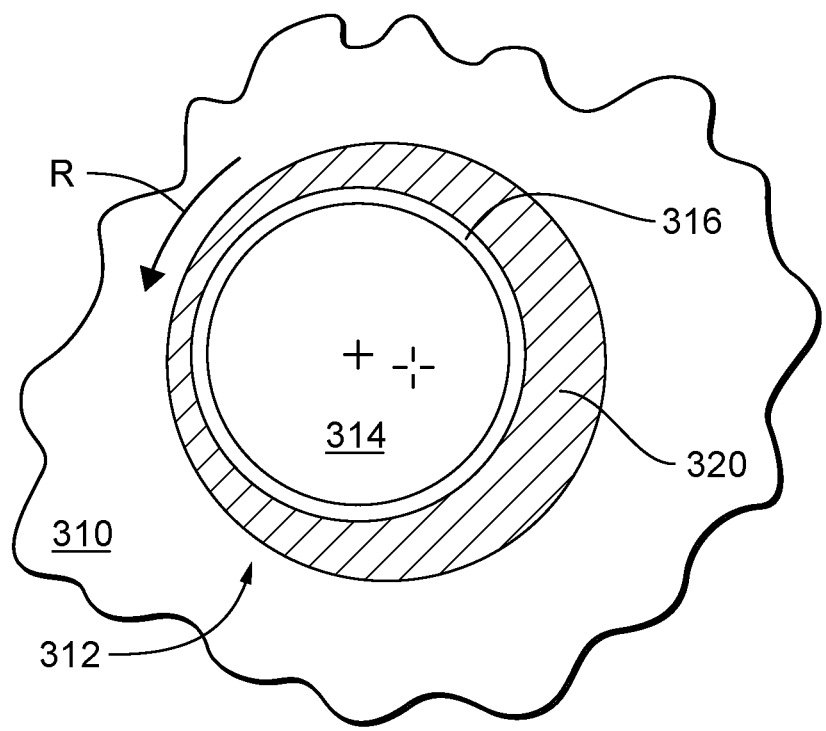

With reference to FIG. 4B, a positioning element 320 is shown according to a second embodiment. Positioning element 320 is similar to positioning element 120 (shown in FIG. 4A) and includes an offset bearing race 316. Bearing race 316 is seated within an aperture 312 of planet carrier 310 and has offset aperture 314 for rotatably supporting a shaft carrying a planetary gear. Respective centers of aperture 312 apertures 314 are offset relative to one another in both circumferentially and radially according to rotation R of positioning element 320.

Figure 4C:
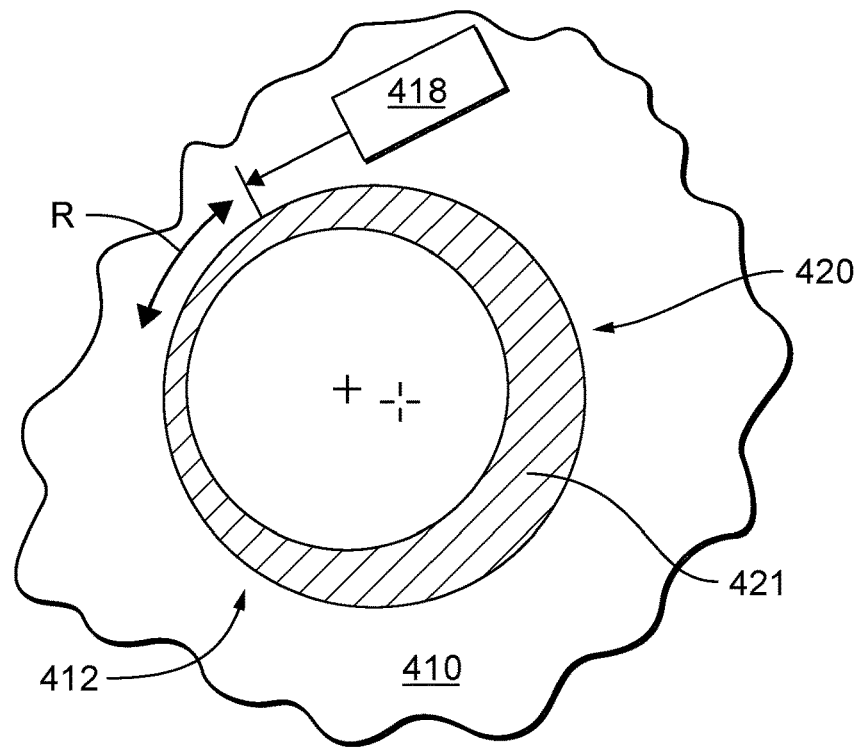

With reference to FIG. 4C, a positioning element 420 is shown according to a third embodiment. Positioning element 420 is similar to positioning element 120 (shown in FIG. 4A) and additionally includes an eccentric coupling 421 operable connected to an actuator 418. Actuator 418 is configured to rotatably drive eccentric coupling in rotation with aperture 412 This enables shifting the radial offset and the circumferential offset of a planetary gear, e.g. first planetary gear 104A (shown in FIG. 2), relative one or more intermeshed planetary gears according to a performance parameter of a planetary gear set, e.g. planetary gear set 100 (shown in FIG. 2). As will be appreciated, the parameter may be a real-time parameter indicative of gear set performance, such as noise, vibration, temperature, load, or any other suitable parameter.

Figure 4D:
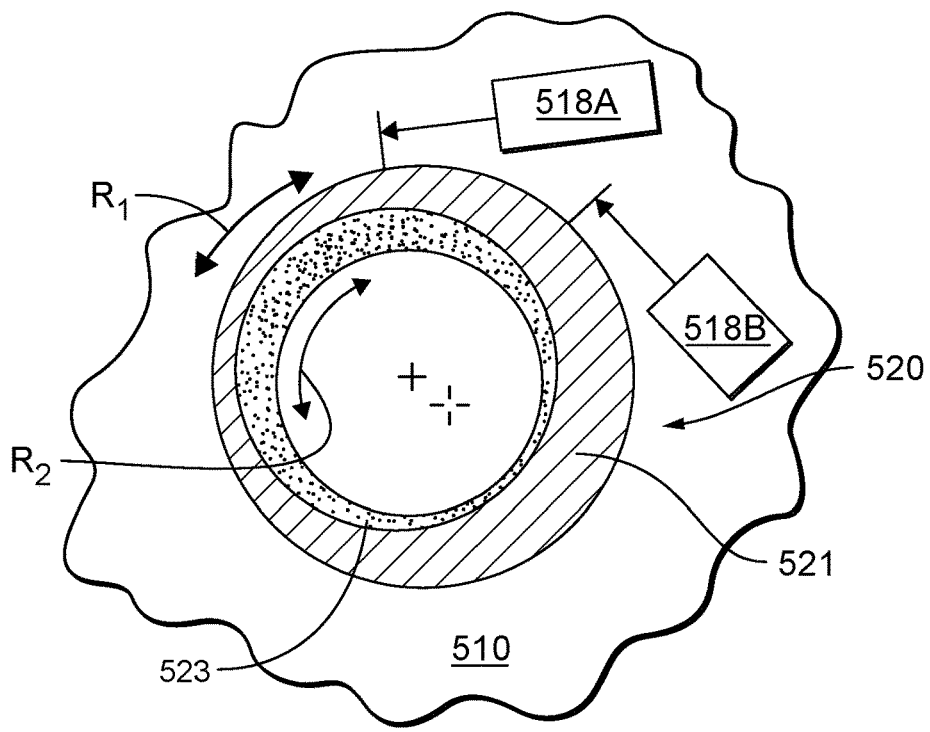

With reference to FIG. 4D, a positioning element 520 is shown according to a fourth embodiment. Positioning element 520 is similar to positioning element 420 (shown in FIG. 4C), and additionally includes a first eccentric coupling 521 rotatably disposed in a second eccentric coupling 523. A first actuator 518A is operably connected to first eccentric coupling 521 and is configured for rotating first eccentric coupling 521 relative thereto. A second actuator 518B is operably connected to second eccentric coupling 523 and is configured for rotating both second eccentric coupling 523 and first eccentric coupling within aperture 512. This enables shifting the radial offset or the circumferential offset of a planetary gear, e.g. first planetary gear 104A (shown in FIG. 2), relative one or more intermeshed planetary gears according to a performance parameter of a planetary gear set, e.g. planetary gear set 100 (shown in FIG. 2). As will be appreciated, the parameter may be a real-time parameter indicative of gear set performance, such as noise, vibration, temperature, load, or any other suitable parameter.

While required in all aspects, positioning element 120 could a piezo electric material 122 or a shape memory alloy 124. The piezo electric material 122 or shape memory alloy 124 is connected to a controller configured and adapted to change the geometry of eccentric component 120 to shaft the axis of rotation of a given planetary gear relative to the planetary carrier, thereby altering the backlash (and load share) of the first planetary gear. Based on a received input, such as a setup command (during assembly) or a torque or noise measurement (during operation) controller may change the eccentricity provided. This allows for adapting the performance of planetary gear set 100 as suitable for a given application or operating condition. However, it is understood that the eccentric components 120 need not include an active shape shifting capacity.

Figure 5:
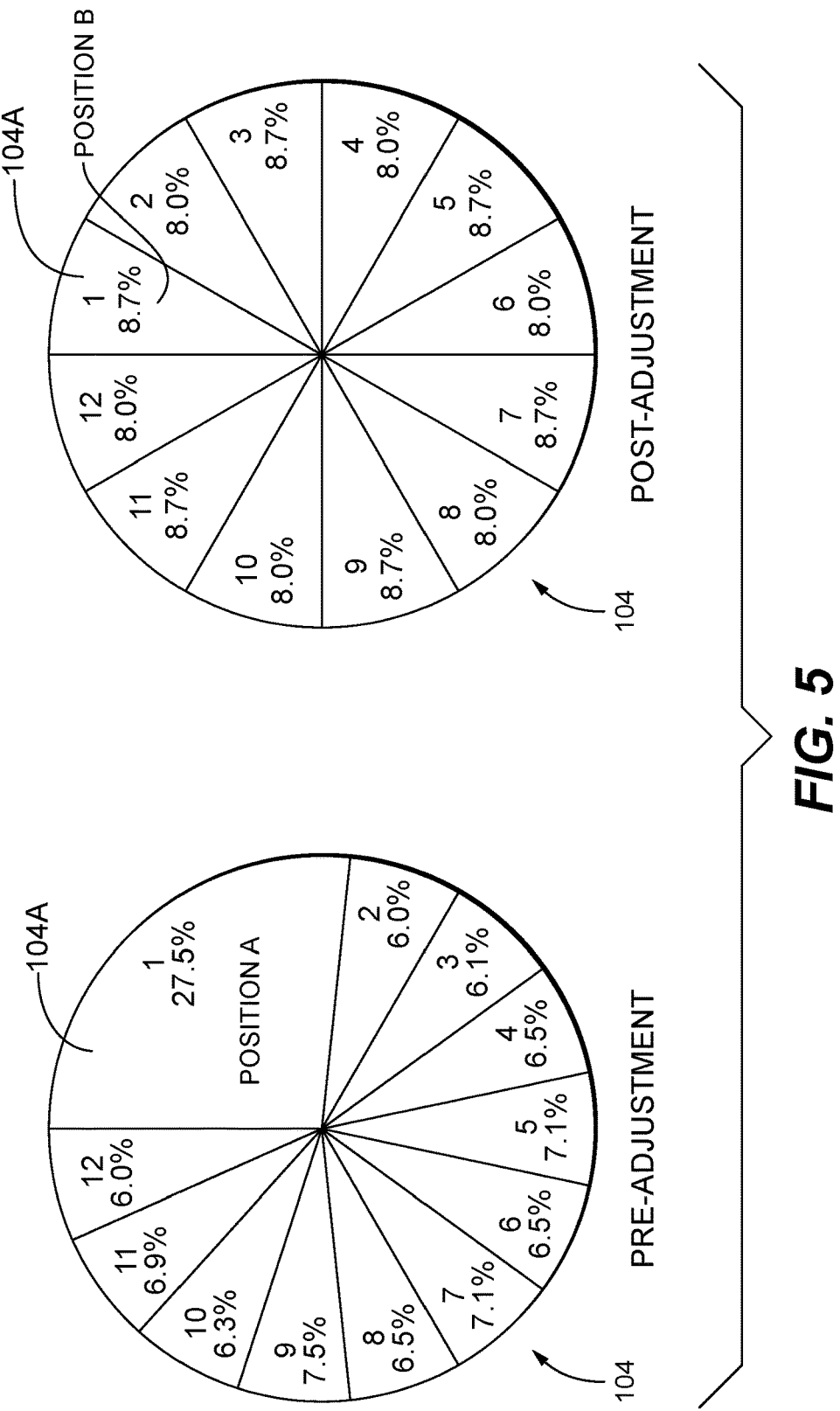
FIG. 5 shows load sharing charts illustrating load share in an exemplary planetary gear arrangement before and after displacing a planetary gear between first and second positions.

Referring now to FIG. 5, load share among a plurality of planetary gears, e.g. planetary gears 104, is shown in an exemplary planetary gear set, e.g. planetary gear set 100 (shown in FIG. 2), before and after moving first planetary gear 104A between first position A and second position B (shown in FIGS. 3A-3C). As indicated in the chart on the left hand side of FIG. 5, load share amongst planetary gears is initially relatively unbalanced—first planetary gear 104A having more than 27% of the load applied to the planetary gears, and the remaining planetary gears having between about 6% and 7.5% of the load. As indicated in the chart appearing on the right hand side of FIG. 5, when first planetary gear 104A is moved to second position B, load on first planetary gear 104A drops to a value more closely corresponding to a mean of the load share carried by the other planetary gears of the planetary gear set. This can improve the performance of the planetary gear set. It can also balance wear in the gear assembly, improving the life time of the gear set by making the planetary gears wear more evenly than would be expected in the pre-adjustment condition shown on the left hand side of FIG. 5.

Figure 6:
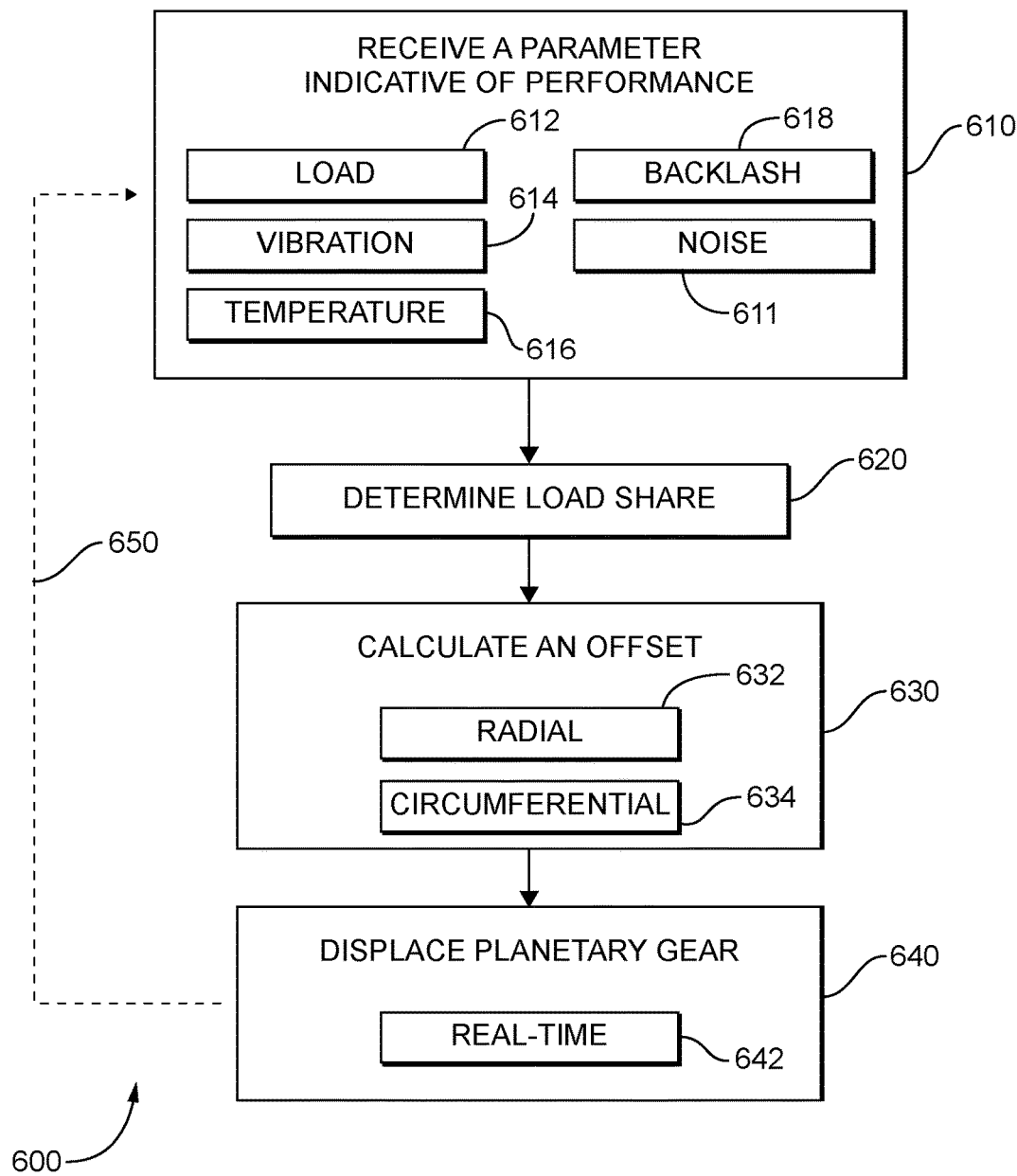
FIG. 6 schematically shows a method of adjusting load share in a planetary gear set.

With reference to FIG. 6, a method of adjusting a planetary gear is generally indicated by reference numeral 600. Adjusting the planetary gear set, e.g. planetary gear set 100 (shown in FIG. 2), generally includes calculating a offset for at least one planetary gear, e.g. first planetary gear 104A (shown in FIG. 2), and displacing the planetary gear, as shown with box 630. Displacing the planetary gear can be done by displacing the planetary gear radially, as shown with box 632, relative to a rotation axis of a sun gear of the planetary gear set. Displacing the planetary gear can be done by displacing the planetary gear circumferentially, as shown with box 634, about a circumference extending about the sun gear rotation axis. Displacing the planetary gear can be displaced both radially and circumferentially relative to the rotation axis.

In embodiments, displacing the planetary gear can be done in real-time, as shown with box 642. Real-time adjustment can be done continuously, as indicated by arrow 650, such as for purposes of maintaining noise generated by the planetary gear set below a predetermined level while transmitting rotational energy—e.g. in a active regime. In this respect the displacing can be while the planetary gear set is transmitting rotational energy between an engine of a rotary wing aircraft (or other type of vehicle) and a rotor disk continuously. For example, as shown with box 610, a parameter indicative to performance of the planetary gear set can be received. The parameter can include one or more of a load 612, vibration 614, temperature 616, backlash 618, and/or noise 611 associated with the planetary gear set. Based on the parameter, load share carried by one or more of the planetary gears can be determined, as shown with box 620.

In certain embodiments the first planetary gear can have an index mark, and the method can include displacing the first planetary gear such that the index mark is further from a corresponding index mark on the sun gear. Displacing the first planetary gear can include matching size of a contact area between the first planetary gear and the sun gear with size of a contact area between the second planetary gear and the sun gear. It is also contemplated that, in accordance with certain embodiments, displacing the first planetary gear can include displacing the first planetary gear using the above-described active element. The displacement can be made in real time, such as in response to noise associated with the planetary gear set and/or load share balance between the first and second planetary gears by way of non-limiting example.

Transmissions for vehicles such as helicopters commonly employ planetary gear sets. Each planetary gear within the planetary gear set is generally expected to carry an equal share of the load applied to the planetary gear set, i.e. the percentage load should be about the total load divided by the number of planetary gears expressed as a percentage. In some gearboxes, due to the process capability of the manufacturing processes used to manufacture the planetary gears, the actual gear tooth contact of planetary gears within a given planetary gear set may not be equivalent for each of the planetary gears. This can cause certain planetary gears to carry a greater percentage of the torsional load applied to the planetary gear set than other planetary gears within the planetary gear set. Such load share imbalance can reduce the expected service life of the planetary gear (or planetary gear set).

One approach to the challenge posed by load share imbalance is characterizing the variation of a given planetary gear, such as in relation to a 'master' planetary gear, and selecting planetary gears for a given planetary gear set based on their respective variation in relation to the 'master' planetary gear. While satisfactory for its intended purpose, this practice can require maintaining greater levels of planetary gear inventory than could be necessary for a contemplated aircraft build schedule. It also does not account for variation in planetary gear positioning attributable to planet carrier variation.

In embodiments described herein, planetary gear sets described herein include eccentric components such as eccentric, offset bearing races, or liners. The eccentric component can enable more precise tuning of individual planetary gear sets such that planetary gear contact within the gear set is substantially equivalent across the planetary gears. This can be done by adjusting one or more of the planetary gears such that backlash of the planetary gears are substantially equivalent with one another (and other planetary gears in the planetary gear set). As will be appreciated by those of skill in the art in view of the present disclosure, planetary gear sets having matched backlash at assembly can be expected to exhibit balanced load share during operation of the planetary gear set, i.e. when transferring rotational energy between input and outputs of a gearbox including the planetary gear set.

In certain embodiments, position of the planetary gears can be adjusted such that a wider range of planetary gear variation can be accepted in a given planetary gear set. This potentially reduces the numbers of planetary gears that need be maintained in inventory in order to satisfy a planetary gear set build schedule. Adjusting planetary gear position can also smooth variation across the planetary gears included in the gear set, potentially increasing the service life of the planetary gears (and planetary gear set). This can also reduce noise.

It is also contemplated that the eccentric element may be marked for calibration purposes for planetary gear set assembly purposes. A bearing retainer can be employed to couple the eccentric component to the planet carrier, allowing incorporation of the eccentric component into existing planet carriers without further modification of the planet carrier. The eccentric element can include an adjustable material, such as a piezo electric material or shape memory alloy, to provide 'real-time' adjustments for load share adjustments while the planetary gear is transmitting rotational energy.

The methods and systems of the present disclosure, as described above and shown in the drawings, provide for planetary gear sets with superior properties including improved load share balancing among planet gears. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A planetary gear carrier assembly to support first and second planetary gears, the planetary gear carrier assembly, comprising:
   a planet carrier defining a sun gear rotation axis and having apertures to rotatably support the first and second planetary gears for rotation about planetary gear rotation axis, wherein at least one of the first and second planetary gear has first and second positions, the second position being offset from the first position relative to the sun gear rotation axis; and
   an actively controlled positioning element coupled to the at least one of the first and second planetary gears and configured to move the at least one of the first and second planetary gears between the first position and the second position for to reduce a load share imbalance between the first and second planetary gears intermeshed between a sun gear and a ring gear of the planetary gear set.

2. A planetary gear carrier assembly set as recited in claim 1, wherein the second position has a radial offset relative to the sun gear rotation axis that is different than a radial offset of the first position relative to the sun gear rotation axis.

3. A planetary gear carrier assembly as recited in claim 1, wherein the second position has a circumferential offset about the sun gear rotation axis that is different than a circumferential offset of the first position relative to the sun gear rotation axis.

4. A planetary gear carrier assembly as recited in claim 1, wherein the second position is offset both radially and circumferentially from the first position relative to the sun gear rotation axis.

5. A planetary gear carrier assembly as recited in claim 1, wherein the positioning element comprises (a) a first eccentric coupling rotatably seated in the planet carrier, and (b) a second eccentric coupling rotatably seated in the first eccentric coupling.

6. A planetary gear carrier assembly as recited in claim 1, wherein the positioning element comprises a single eccentric coupling seated in the planet carrier.

7. A planetary gear carrier assembly as recited in claim 1, wherein the positioning element comprises an eccentric bearing race.

8. A planetary gear carrier assembly as recited in claim 1, wherein the positioning element comprises an eccentric bearing liner.

9. A planetary gear carrier assembly as recited in claim 1, further including a linear actuator operably connected to the positioning element to drive the eccentric coupling between the first and second positions.

10. A rotorcraft transmission having a planetary gear carrier assembly as recited in claim 1.

11. A method of adjusting a planetary gear arrangement, comprising:

determining load share among a plurality of planetary gears intermeshed between a sun gear and a ring gear;

calculating a position change for a first planetary gear relative to a rotation axis of the sun gear based on the load share among the plurality of planetary gears; and reducing load share imbalance among the plurality of planetary gears by changing position of the first planetary gear relative to the rotation axis of the sun gear.

12. A method as recited in claim 11, wherein reducing load share imbalance includes displacing the planetary gear radially relative to the rotation axis of the sun gear.

13. A method as recited in claim 11, wherein reducing load share imbalance includes displacing the planetary gear circumferentially relative to the rotation axis of the sun gear.

14. A method as recited in claim 11, wherein changing position of the first of the plurality or planetary gears includes changing the position real-time, while transferring rotational power through the planetary gear set.

15. A method as recited in claim 11, wherein determining load share among the plurality of planetary gears includes determining load share using data indicative of at least one of force, acceleration, backlash, noise, and temperature within the planetary gear set.

* * * * *